(12) United States Patent
Hollo

(10) Patent No.: US 10,383,379 B2
(45) Date of Patent: Aug. 20, 2019

(54) ELECTRONIC DEVICE HOLDING SYSTEM

(71) Applicant: Suzanne Hollo, Rockaway Park, NY (US)

(72) Inventor: Suzanne Hollo, Rockaway Park, NY (US)

(*) Notice: Subject to any disclaimer, the term of this patent is extended or adjusted under 35 U.S.C. 154(b) by 172 days.

(21) Appl. No.: 15/485,922

(22) Filed: Apr. 12, 2017

(65) Prior Publication Data

US 2018/0295908 A1    Oct. 18, 2018

(51) Int. Cl.
*A41D 19/00* (2006.01)
*H04M 1/04* (2006.01)
*H04B 1/3827* (2015.01)
*A45F 5/02* (2006.01)

(52) U.S. Cl.
CPC ............ *A41D 19/0037* (2013.01); *A45F 5/02* (2013.01); *H04B 1/385* (2013.01); *H04M 1/04* (2013.01); *A45F 2200/0516* (2013.01); *H04B 2001/3861* (2013.01)

(58) Field of Classification Search
CPC .............. A41D 19/002; A41D 19/0024; A41D 19/0037; A41D 19/01594; A41D 19/00; A41D 19/0034; A45C 2011/002; A45C 2011/003; A45F 5/02; A45F 2200/0516; H04B 2001/3861; B60R 11/02
USPC ............ 2/160, 247, 249, 250; 224/217, 219; 248/663, 481, 181.1, 288.31, 248/223.31–224.61
See application file for complete search history.

(56) References Cited

U.S. PATENT DOCUMENTS

| | | | |
|---|---|---|---|
| 6,696,986 B1* | 2/2004 | Harrison, Jr. | G06F 1/163 224/219 |
| 7,334,711 B1 | 2/2008 | Winters | |
| D716,287 S | 10/2014 | Ambriz | |
| D739,610 S | 9/2015 | Richmond | |
| 9,149,077 B1 | 10/2015 | Browning | |
| 9,667,050 B1* | 5/2017 | Vrame | H02G 3/22 |
| 2007/0083979 A1 | 4/2007 | Daniels | |
| 2007/0099469 A1* | 5/2007 | Sorensen | A45F 5/02 439/289 |
| 2007/0101479 A1 | 5/2007 | Turner | |
| 2007/0262112 A1* | 11/2007 | Butler | A45C 11/182 224/669 |
| 2008/0084390 A1 | 4/2008 | Jones | |
| 2014/0073376 A1 | 3/2014 | Noble Nava | |
| 2015/0237181 A1 | 8/2015 | Khan et al. | |
| 2017/0179995 A1* | 6/2017 | Oviedo | A41D 19/0013 |

* cited by examiner

Primary Examiner — Clinton T Ostrup
Assistant Examiner — Patrick J. Lynch

(57) ABSTRACT

An electronic device holding system for inhibiting an electronic device from being dropped includes an electronic device and a glove that is selectively worn. A receiver is coupled to the glove and a mounting unit is removably coupled to the electronic device. The mounting unit releasably engages the receiver to retain the electronic device on the glove. In this way the electronic device is inhibited from being dropped when the glove is worn.

7 Claims, 6 Drawing Sheets

ELECTRONIC DEVICE HOLDING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to holding devices and more particularly pertains to a new holding device for inhibiting an electronic device from being dropped.

(2) Description of Related Art Including Information Disclosed Under 37 CFR 1.97 and 1.98

The prior art relates to holding devices.

BRIEF SUMMARY OF THE INVENTION

An embodiment of the disclosure meets the needs presented above by generally comprising an electronic device and a glove that is selectively worn. A receiver is coupled to the glove and a mounting unit is removably coupled to the electronic device. The mounting unit releasably engages the receiver to retain the electronic device on the glove. In this way the electronic device is inhibited from being dropped when the glove is worn.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
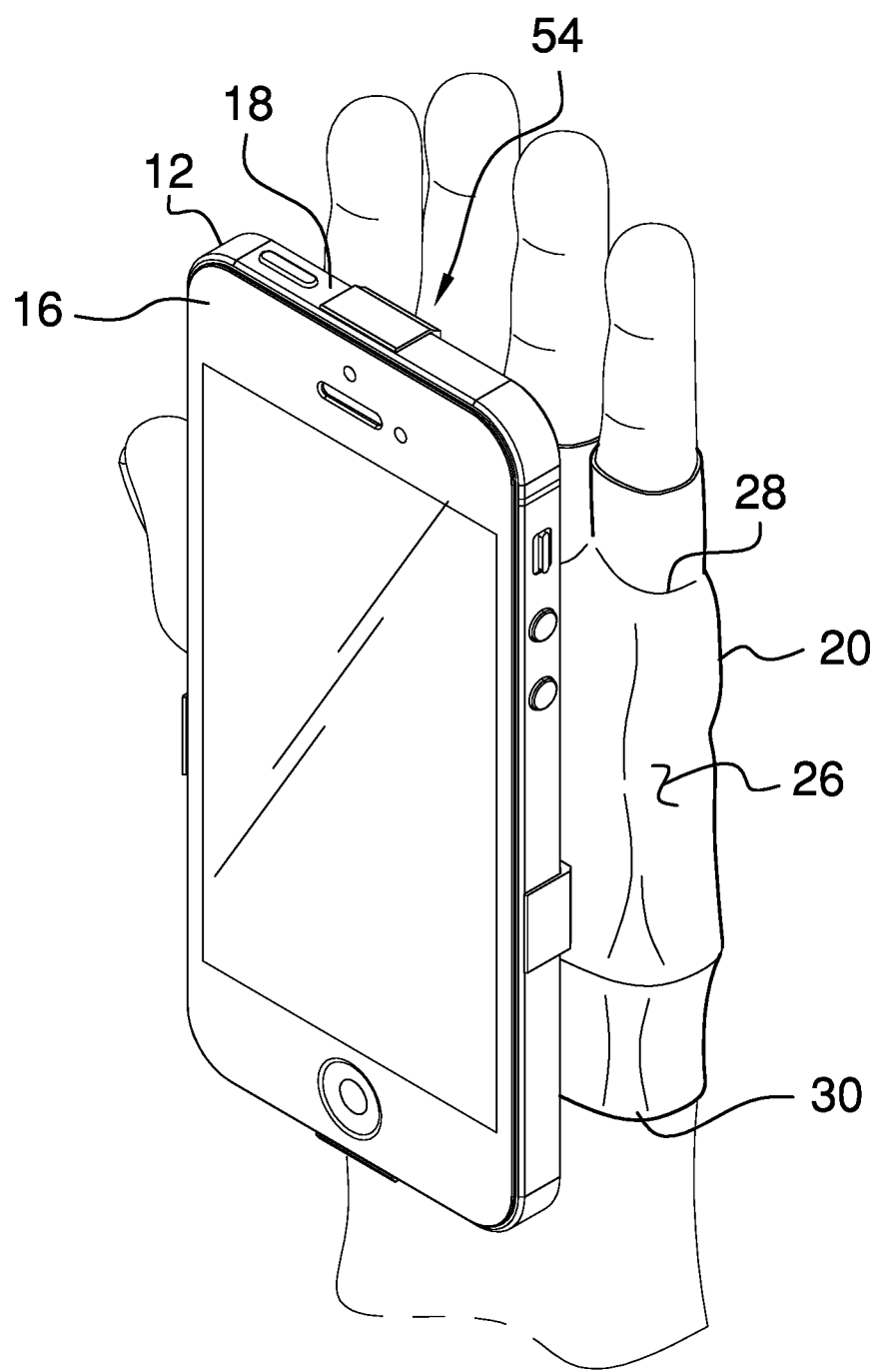
FIG. 1 is a perspective in-use view of an electronic device holding system according to an embodiment of the disclosure.
Figure 2:
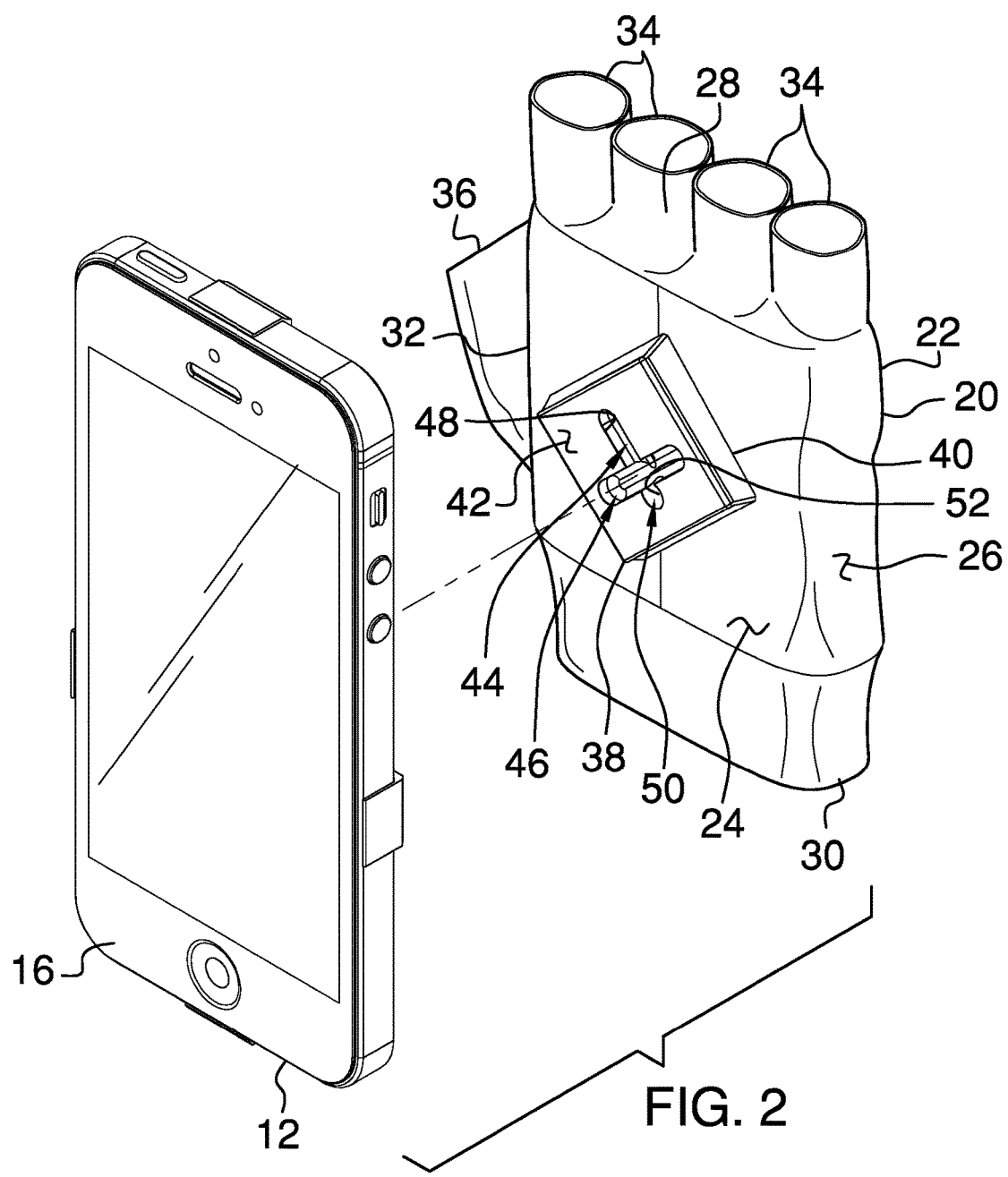
FIG. 2 is an exploded perspective view of an embodiment of the disclosure.
Figure 3:
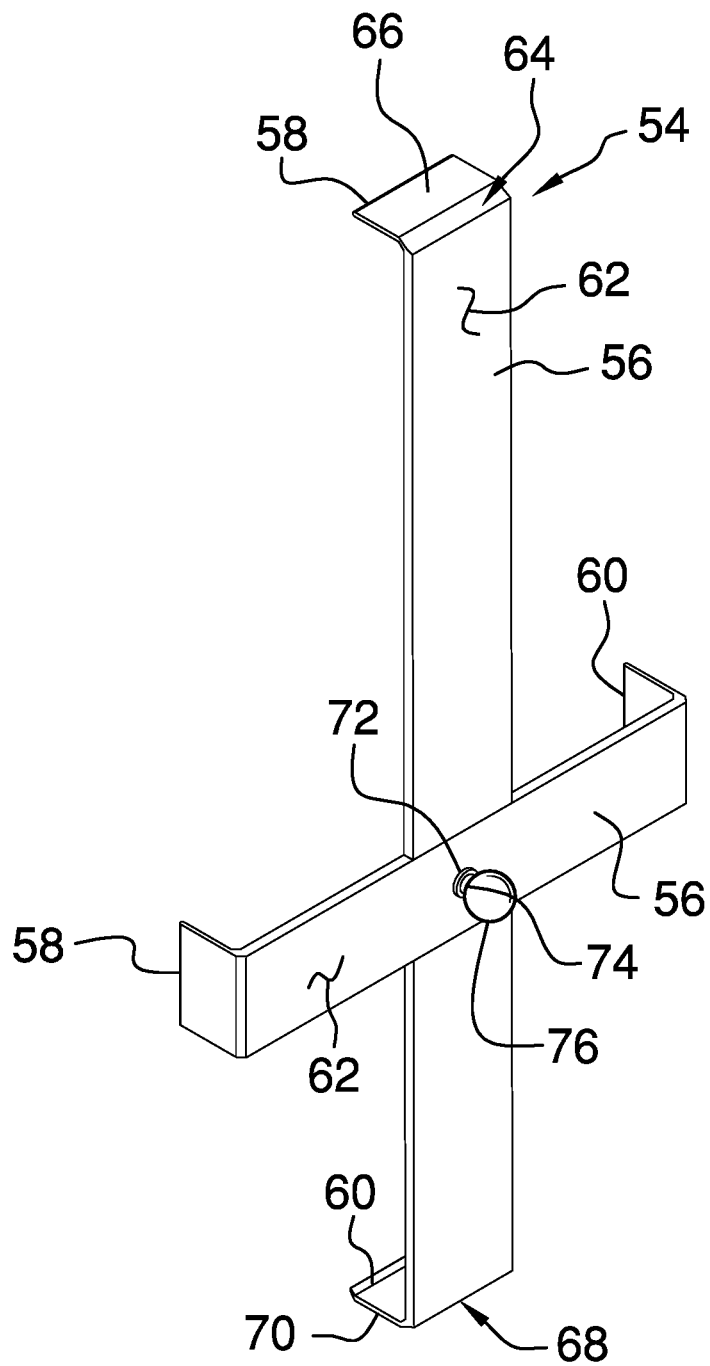
FIG. 3 is a back perspective view of a mounting unit of an embodiment of the disclosure.
Figure 4:
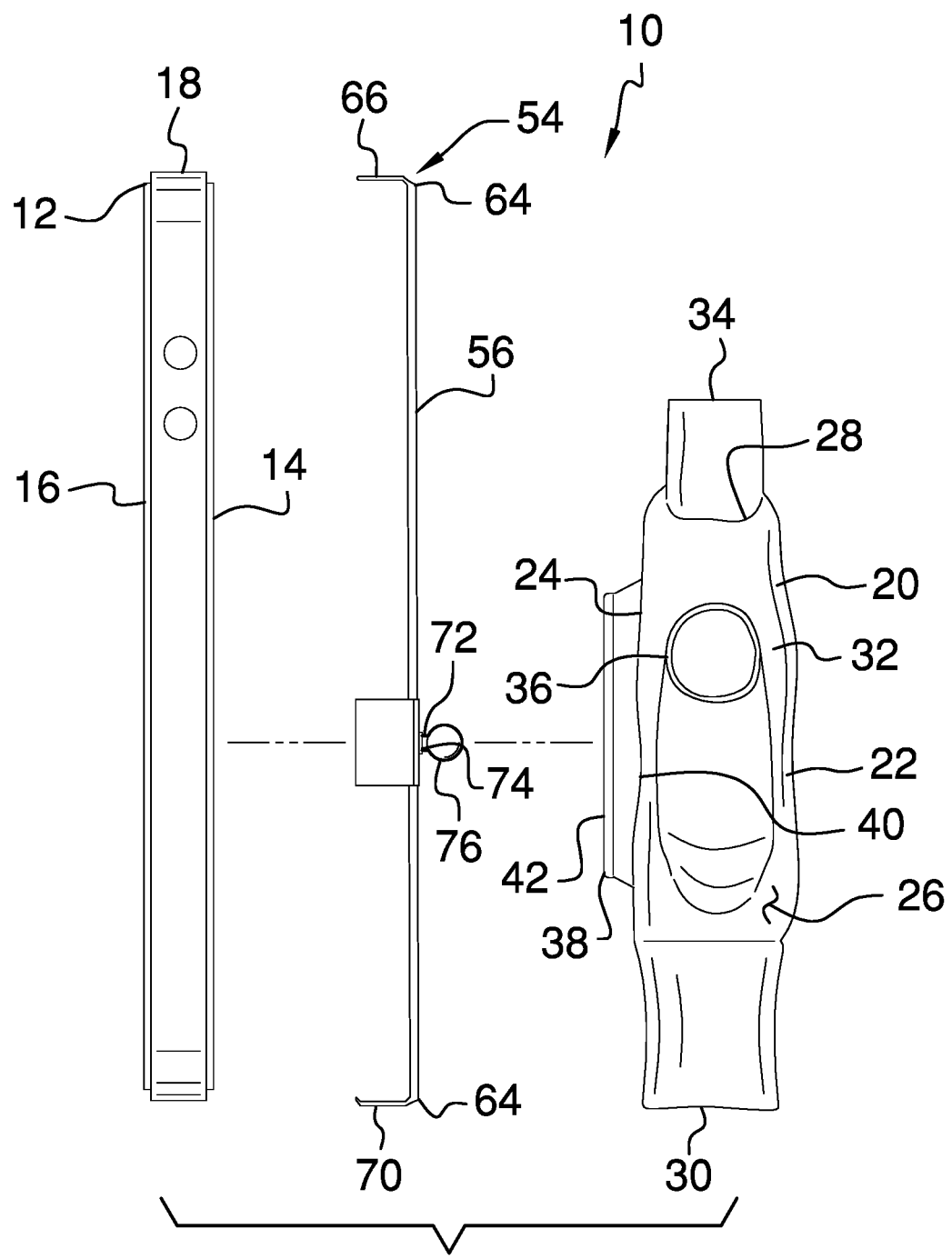
FIG. 4 is a left side exploded view of an embodiment of the disclosure.
Figure 5:
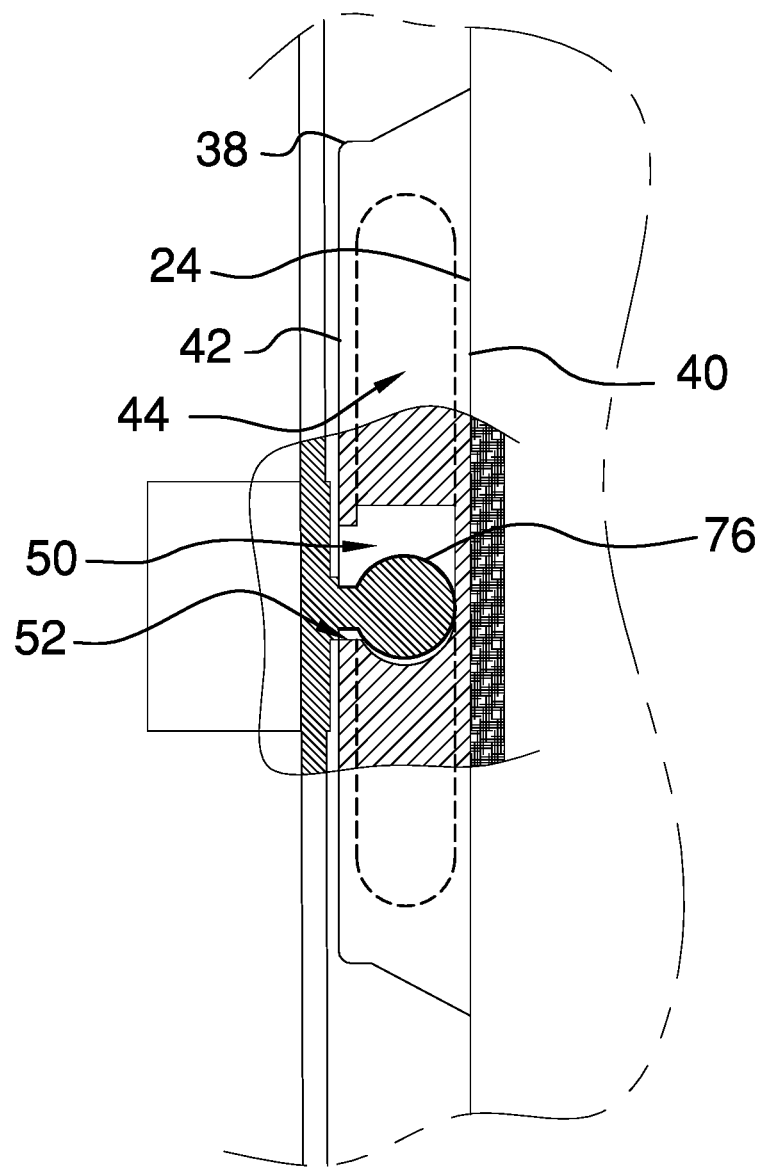
FIG. 5 is a left side cutaway view of an embodiment of the disclosure.

With reference now to the drawings, and in particular to FIGS. 1 through 6 thereof, a new holding device embodying the principles and concepts of an embodiment of the disclosure and generally designated by the reference numeral 10 will be described.

As best illustrated in FIGS. 1 through 6, the electronic device holding system 10 generally comprises an electronic device 12 that has a back side 14, a front side 16 and a peripheral edge 18 extending therebetween. The electronic device 12 may be a smart phone or the like and the electronic device 12 includes a display. A glove 20 is provided that is selectively worn. The glove 20 has a top surface 22, a bottom surface 24 and a peripheral surface 26 extending therebetween. The peripheral surface 26 has a front side 28, a back side 30 and a first lateral side 32. The front side 28 of the glove 20 has a plurality of first tubes 34 extending outwardly therefrom to receive fingers when the glove 20 is worn having the front side 28 of the glove 20 lying on a palm. The first lateral side 32 has a second tube 36 extending laterally away therefrom to receive a thumb when the glove 20 is worn.

A receiver 38 is provided and the receiver 38 is coupled to the glove 20. The receiver 38 has a first surface 40 and a second surface 42, and the first surface 40 is coupled to the bottom surface 24 of the glove 20. Moreover, the receiver 38 is positioned on the palm when the glove 20 is worn. The second surface 42 has a first slot 44 extending toward the first surface 40 and the second surface 42 has a second slot 46 extending toward the first surface 40. The first slot 44 intersects the second slot 46 and is oriented perpendicular to the second slot 46. Thus, each of the first 44 and second 46 slots forms a T.

Each of the first 44 and second 46 slots has a bounding edge 48. Moreover, each of the first 44 and second 46 slots extends laterally beyond the bounding edge 48 between the first surface 40 and the second surface 42. The second surface 42 has a well 50 extending toward the first surface 40 and the well 50 has a bounding edge 52. The bounding edge 52 of the well 50 is continuous such that the well 50 has a circular shape. Additionally, the well 50 is aligned with an intersection of the first slot 44 and the second slot 46.

A mounting unit 54 is provided and the mounting unit 54 is removably coupled to the electronic device 12. The mounting unit 54 releasably engages the receiver 38 to retain the electronic device 12 on the glove 20. In this way the mounting unit 54 inhibits the electronic device 12 from being dropped when the glove 20 is worn. The mounting unit 54 comprises a pair of members 56 and each of the members 56 has a first end 58, a second end 60 and a first surface 62 extending therebetween. The pair of members 56 intersects each other and is oriented perpendicular to each other such that the pair of members 56 forms a plus.

Each of the members 56 has a first bend 64 that is positioned closer to the first end 58 than the second end 60 to define a first tab 66 extending away from each of the members 56. Each of the members 56 has a second bend 68 that is positioned closer to the second end 60 than the first end 58 to define a second tab 70 extending away from each of the members 56. Moreover, each of the first 66 and second 70 tabs frictionally engages the peripheral edge 18 of the electronic device 12 having the back side 14 of the electronic device 12 abutting each of the members 56.

Figure 6:
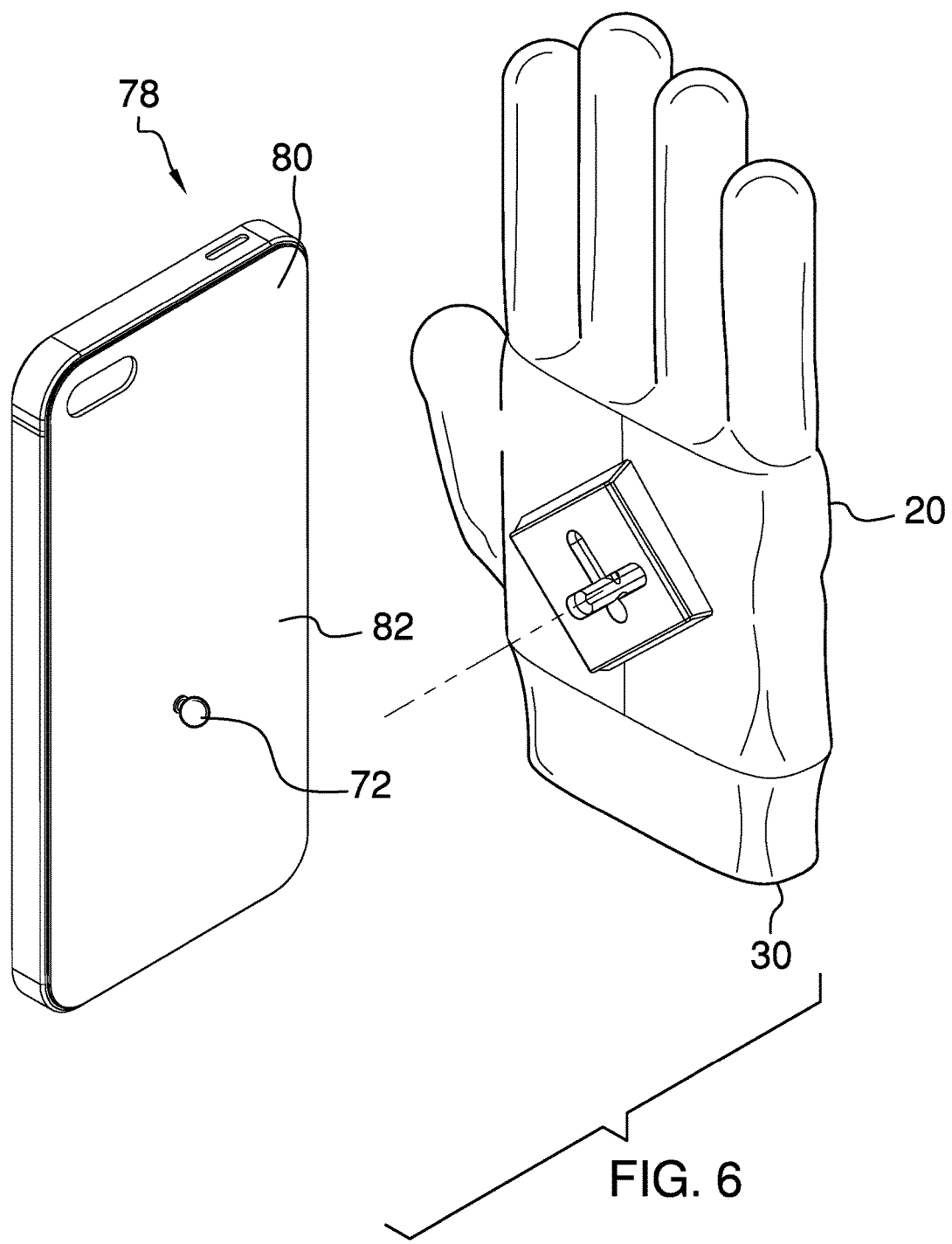
FIG. 6 is a perspective view of an embodiment of the disclosure.

A peg 72 is coupled to and extends away from the first surface 40 of the members 56. The peg 72 is positioned at an intersection of the members 56 and the peg 72 has a distal end 74 with respect to the first surface 40. A ball 76 is coupled to the distal end 74 of the peg 72 and the ball 76 is selectively inserted into the well 50. The ball 76 is slidably urged into a selected one of the first 44 and second 46 slots. Moreover, the ball 76 engages the bounding edge 48 corresponding to the first 44 and second 46 slots such that the ball 76 is inhibited from is urged outwardly from the selected first 44 and second 46 slots. In this way the electronic device 12 is slidably to the glove 20. In an alternative embodiment 78 as shown in FIG. 6, the mounting unit 54 may include a case 80 that insertably receives the electronic device 12. The case 80 may have a rear wall 82 and the peg 72 may be coupled to and extend away from the rear wall 82. Additionally, the glove 20 may be a full finger and full thumb glove.

In use, the glove 20 is worn and the mounting unit 54 is coupled to the electronic device 12. The ball 76 is inserted into the well 50 and the mounting unit 54 is manipulated to urge the ball 76 into a selected one of the first slot 44 and the second slot 46. In this way the electronic device 12 is slidably coupled to the glove 20 thereby inhibiting the electronic device 12 from being dropped. Additionally, the each of the first 44 and second 46 slots facilitate the electronic device 12 to be positioned at a variety of angles on the glove 20. The electronic device 12 is removable at any time from the mounting unit 54. Moreover, the mounting unit 54 is removable at any time from the receiver 38 while the electronic device 12 remains in the mounting unit 54. The electronic device 12 is usable regardless of whether or not the electronic device 12 is positioned in the mounting unit 54.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic device holding system comprising:
   an electronic device having a back side, a front side and a peripheral edge extending therebetween;
   a glove being configured to be worn, said glove having a top surface, a bottom surface and a peripheral surface extending therebetween, said peripheral surface having a front side, a back side and a first lateral side, said front side having a plurality of first tubes extending outwardly therefrom wherein each of said first tubes is configured to receive fingers when said glove is worn having said front side lying on a palm, said first lateral side having a second tube extending laterally away therefrom wherein said second tube is configured to receive a thumb when said glove is worn;
   a receiver being coupled to said glove, said receiver having a first surface and a second surface, said first surface being coupled to said bottom surface of said glove wherein said receiver is configured to be positioned on the palm when said glove is worn, said second surface having a first slot extending toward said first surface, said second surface having a second slot extending toward said first surface, said first slot being oriented perpendicular to and intersecting said second slot such that each of said first and second slots forms a t shape at an intersection such that said first slot has a longer segment and a shorter segment extending from said intersection with said second slot, each of said first and second slots having a bounding edge, each of said first and second slots extending laterally beyond said bounding edge within said receiver, said second surface has a well extending toward said first surface, a bounding edge of said well located within said receiver being continuous such that said well has a circular shape that extends from said bounding edge of said well to a bottom of said well, said well being aligned with said intersection of said first slot and said second slot; and
   a mounting unit being removably coupled to said electronic device, said mounting unit releasably engaging said receiver to retain said electronic device on said glove thereby inhibiting said electronic device from being dropped when said glove is worn.

2. The system according to claim 1, wherein said mounting unit comprises a pair of members, each of said members having a first end, a second end and a first surface extending therebetween, said pair of members intersecting each other and being oriented perpendicular to each other such that said pair of members forms a plus.

3. The system according to claim 2, wherein each of said members has a first bend being positioned closer to said first end than said second end to define a first tab extending away from each of said members.

4. The system according to claim 3, wherein each of said members has a second bend being positioned closer to said second end than said first end to define a second tab extending away from each of said members, each of said first and second tabs frictionally engaging said peripheral edge of said electronic device having said back side of said electronic device abutting each of said members.

5. The system according to claim 2, further comprising a peg being coupled to and extending away from said first surface of said members, said peg being positioned at an intersection of said members, said peg having a distal end with respect to said first surface.

6. The system according to claim 5, further comprising:
said receiver having a first slot, a second slot and a well, each of said first and second slots having a bounding edge; and
a ball being coupled to said distal end of said peg, said ball being selectively inserted into said well, said ball being slidably urged into a selected one of said first and second slots, said ball engaging said bounding edge corresponding to said first and second slots such that said ball is inhibited from being urged outwardly from said selected first and second slot thereby slidably coupling said electronic device to said glove.

7. An electronic device holding system comprising:
an electronic device having a back side, a front side and a peripheral edge extending therebetween;
a glove being configured to be worn, said glove having a top surface, a bottom surface and a peripheral surface extending therebetween, said peripheral surface having a front side, a back side and a first lateral side, said front side having a plurality of first tubes extending outwardly therefrom wherein each of said first tubes is configured to receive fingers when said glove is worn having said front side lying on a palm, said first lateral side having a second tube extending laterally away therefrom wherein said second tube is configured to receive a thumb when said glove is worn;
a receiver being coupled to said glove, said receiver having a first surface and a second surface, said first surface being coupled to said bottom surface of said glove wherein said receiver is configured to be positioned on the palm when said glove is worn, said second surface having a first slot extending toward said first surface, said second surface having a second slot extending toward said first surface, said first slot being oriented perpendicular to and intersecting said second slot such that each of said first and second slots forms a t shape at an intersection such that said first slot has a longer segment and a shorter segment extending from said intersection with said second slot, each of said first and second slots having a bounding edge, each of said first and second slots extending laterally beyond said bounding edge within said receiver, said second surface having a well extending toward said first surface, a bounding edge of said well located within said receiver being continuous such that said well has a circular shape that extends from said bounding edge of said well to a bottom of said well, said well being aligned with said intersection of said first slot and said second slot; and
a mounting unit being removably coupled to said electronic device, said mounting unit releasably engaging said receiver to retain said electronic device on said glove thereby inhibiting said electronic device from being dropped when said glove is worn, said mounting unit comprising:
a pair of members, each of said members having a first end, a second end and a first surface extending therebetween, said pair of members intersecting each other and being oriented perpendicular to each other such that said pair of members forms a plus, each of said members having a first bend being positioned closer to said first end than said second end to define a first tab extending away from each of said members, each of said members having a second bend being positioned closer to said second end than said first end to define a second tab extending away from each of said members, each of said first and second tabs frictionally engaging said peripheral edge of said electronic device having said back side of said electronic device abutting each of said members,
a peg being coupled to and extending away from said first surface of said members, said peg being positioned at an intersection of said members, said peg having a distal end with respect to said first surface, and
a ball being coupled to said distal end of said peg, said ball being selectively inserted into said well, said ball being slidably urged into a selected one of said first and second slots, said ball engaging said bounding edge corresponding to said first and second slots such that said ball is inhibited from being urged outwardly from said selected first and second slot thereby slidably coupling said electronic device to said glove.

* * * * *